Sept. 14, 1965    P. J. W. JOCHEMS    3,205,572
METHOD OF SOLDERING CONNECTING WIRES TO A SEMI-CONDUCTOR BODY
Filed Dec. 19, 1962

INVENTOR
P. J. W. JOCHEMS
BY
AGENT

United States Patent Office

3,205,572
Patented Sept. 14, 1965

3,205,572
METHOD OF SOLDERING CONNECTING WIRES TO A SEMI-CONDUCTOR BODY
Pieter Johannes Wilhelmus Jochems, Emmasingel, Eindhoven, Netherlands, assignor to North American Philips Company, Inc., New York, N.Y., a corporation of Delaware
Filed Dec. 19, 1962, Ser. No. 245,809
Claims priority, application Netherlands, Jan. 15, 1962, 273,574
6 Claims. (Cl. 29—471.1)

The invention relates to a method of soldering connecting wires to a semi-conductor body, more particularly to electrodes alloyed onto a semi-conductor body and to apparatus for carrying out said method.

The term "soldering" is to be understood to denote herein not only the fastening of a wire to a semi-conductor body or to an alloyed electrode by means of a solder which may coat for example the end of the wire, but also the fusion of a wire to an electrode by dipping the wire at one end into a temporarily wholly or partly molten electrode.

Soldering of connecting wires to a semi-conductor body, more particularly to electrodes alloyed onto a semi-conductor body, which is usually carried out with transistors, becomes gradually more difficult according as the dimensions of the semi-conductor body and hence the relative distance of the electrodes diminish. Particular difficulties arise in soldering previously cut lengths of wire with respect to the mechanical support of said lengths of wire. Supporting the wires during the soldering operation by means of tweezers, in which operation a number of electrodes are provided one by one with a connecting wire, does not yield satisfactory results, since, when one wire is soldered to an electrode, a wire previously soldered to an electrode is very likely to disengage itself.

The invention has for its object inter alia to provide a simple method in which a semi-conductor body is provided at the same time with a number of connecting wires, in which particularly electrodes alloyed onto a semi-conductor body are provided simultaneously with a connecting wire. In accordance with the invention, the method of soldering connecting wires to a semi-conductor body, particularly to electrodes alloyed onto a semi-conductor body is characterized in that during the soldering operation the connecting wires are held in place only by a magnetic field.

At least the places to be connected with the connecting wires by soldering are heated to the temperature required for soldering preferably before the connecting wires are brought into contact with said places.

The semi-conductor body may be heated in a simple manner to the soldering temperature by disposing it on a support, for example a carbon block, which is heated. Heating may be carried out by radiation, for example with the aid of an incandescent lamp.

With a further advantageous embodiment of the method, only the places to be provided with the connecting wires by soldering are heated to the soldering temperature by radiation. This embodiment has the advantage that it is not necessary to heat the whole semi-conductor body to the soldering temperature.

The invention furthermore relates to apparatus for carrying out the method according to the invention. In accordance with the invention this apparatus is characterized in that it comprises two opposite pole shoes, between which, that is to say nearer one of the pole shoes, a support for example a carbon block is arranged, on which a semi-conductor device can be disposed, there being provided a radiation source, for example an incandescent lamp, and an optical expedient for example a mirror for projecting the radiation source onto the support. One pole shoe is preferably provided with a bore through which the source of radiation is projected onto the support.

The invention will now be described more fully with reference to one embodiment and the drawing.

Figure 1:
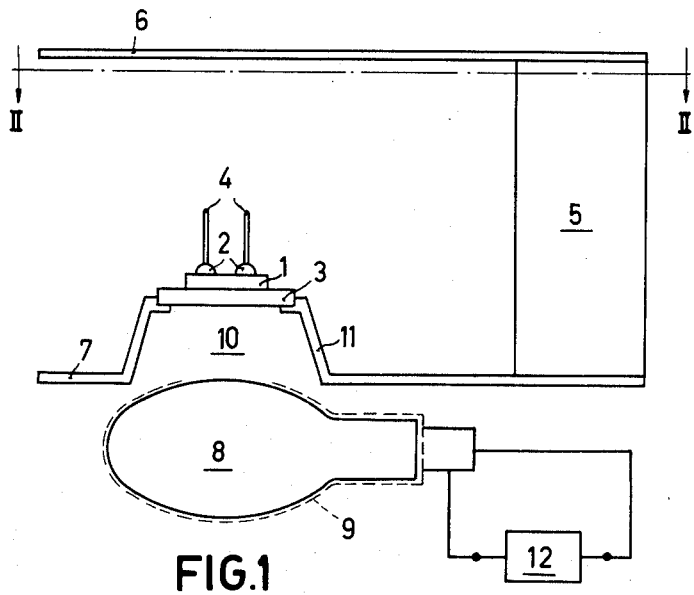
FIG. 1 shows in a sectional view an arrangement for carrying out the method according to the invention.
Figure 2:
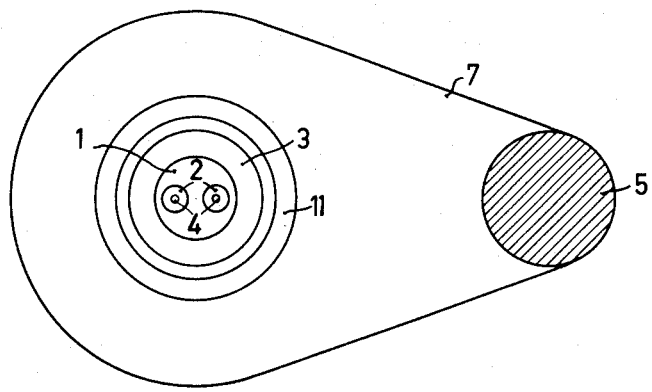
FIG. 2 shows diagrammatically a plan view of the lower pole shoe of the arrangement according to FIG. 1.

By way of example there will be described the soldering of connecting wires to electrodes alloyed onto a semi-conductor body. The semi-conductor body 1 for example of germanium, having dimensions of 2 x 2 x 0.1 mms., provided with alloyed electrodes 2, for example of lead containing about 2% by weight of antimony and having a diameter of 150 $\mu$ and an intermediate distance of 50 $\mu$, is arranged in the magnetic field of a magnet 5, which is provided with opposite pole shoes 6 and 7. The pole shoes 6 and 7 may consist of soft magnetic iron and have a thickness of about 5 mms. and a greatest dimension of about 76 mms. The distance between the pole shoes may be about 42 mms. The magnet 5 may be a permanent magnet, for instance consisting of a magnetic material known as Ticonal and having a height of about 42 mms. and a thickness of about 22 mms. The magnet 5 may be an electro-magnet also. The field strength of the magnetic field between the pole shoes 6 and 7 is about 250 gauss. The connecting wires 4, having a length of about 6 mms. and a diameter of about 100 $\mu$, made from a magnetizable material, for example nickel, iron or fernico, which may be gold-plated, are disposed on the electrodes 2. By heating at about 350° C. the wires 4 are soldered to the electrodes 2, the wires 4 being held in place only by the magnetic field while there is no jig employed for these wires. The wires are practically parallel to the lines of magnetic force between the pole shoes 6 and 7.

The semi-conductor body 1 and the electrodes 2 may be heated to the soldering temperature by heating the support 3 on which the semi-conductor body 1 is disposed, for example by radiation. The support 3 may consist of a carbon block of 8 x 8 x 3 mms. and is arranged nearer the pole shoe 7. The radiation source may be an incandescent lamp, the filament of which is projected for example with the aid of a mirror onto the support 3.

The radiation may be incident on the support 3 in a lateral direction approximately parallel to the pole shoes 6 and 7. However, use is preferably made of an arrangement as shown in the figure, in which the pole shoe 7 is provided with a bore 10 and, if desired, with an embossed part 11. The incandescent lamp 8, for example a 16 mm.-film lamp of 50 w. having a reflecting layer 9, irradiates the support 3 via the bore 10. The reflecting layer 9 projects the image of the filament of the lamp onto the support 3. The incandescent lamp 8 may be connected to a current source 12.

The semi-conductor body 1 with the alloyed electrodes 2 is heated to the soldering temperature preferably before the connecting wires 4 are disposed on the electrodes 2.

The wires 4 need not be straight wires; they may be provided for example with an S-shaped bend in order to increase the resilience.

It will be obvious that the invention is not restricted to the embodiment described above and that within the scope of the invention many variants may be made by those skilled in the art. For example the semi-conductor body may be heated by blowing a hot gas, for example of nitrogen, onto it or by means of a bifilar, wound heating coil, which does substantially not disturb the magnetic field. Moreover, only the places to be provided with the connecting wires by soldering may be heated by radiation to the soldering temperature, so that not the whole semi-conductor body need be heated. The alloyed electrodes and also the semi-conductor body may furthermore be made from materials usually employed in the semi-conductor technique other than the materials indicated above. The soldering temperature must be adapted to the materials employed. Although a method according to the invention can be used advantageously for soldering a single connecting wire to a semi-conductor body or to an alloyed electrode, the advantage of the invention becomes conspicuous in the simultaneous soldering of a number of connecting wires, if desired to a number of separate semi-conductor bodies or to alloyed electrodes.

What is claimed is:

1. A method of soldering plural magnetic connecting wires at their ends to portions of a semiconductor body, comprising establishing a magnetic field whose lines of force extend from the portions of the semiconductor body where the wires are to be soldered in the direction that the wires are to extend after being soldered to the semiconductor body, placing the wires in the magnetic field with the wire ends contacting the semiconductor body portions where they are to be soldered in the presence of solder thereat and removing the placing means so that said magnetic field becomes the sole means for holding the wires in position with their ends in contact with the semi-conductor body portions, and while the wires are held in position solely by means of the magnetic field without the use of positioning jigs and the like, heating the wire ends and the contacted semiconductor body portions to solder and permanently connect them together.

2. A method as set forth in claim 1 wherein the semiconductor body is placed upon a support, and the latter is heated by radiation to effect the soldering operation.

3. A method of soldering plural magnetic connecting wires at their ends to closely-spaced electrodes alloyed onto a semiconductor body, comprising providing vertically-spaced magnetic pole members and establishing between the pole members a magnetic field whose lines of force extend vertically, providing between the pole members adjacent the lower pole member the semiconductor body with the electrodes where the wires are to be soldered facing upwardly, placing the wires vertically between the pole members in the magnetic field with the lower wire ends contacting the electrodes where they are to be soldered and removing the placing means so that said magnetic field becomes the sole means for holding the wires vertically in position with their ends in contact with the electrodes, and while the wires are held in position solely by means of the magnetic field without the use of positioning jigs and the like, heating the wire ends and the electrodes to melt the latter and thus solder and permanently connect the wires to the electrodes.

4. A method as set forth in claim 3 wherein the electrodes are heated to the soldering temperature before the wires are placed in contact therewith in the magnetic field.

5. Apparatus for soldering plural magnetic connecting wires to portions of a semiconductor body, comprising two spaced opposed magnetic pole members, means for establishing a magnetic field between said pole members such that its lines of force extend therebetween, support means for a semiconductor body arranged between the pole members, and a radiation source for heating the support to a temperature at which a soldering operation may be performed on the body.

6. Apparatus as set forth in claim 5 wherein one pole member has an aperture underneath the support, and the radiation source is an incandescent lamp, and the heat radiation from the lamp is projected through the aperture onto the support to heat same.

References Cited by the Examiner

UNITED STATES PATENTS

| | | | |
|---|---|---|---|
| 2,346,555 | 4/44 | Cobb | 29—493 X |
| 2,425,127 | 8/47 | Schafer. | |
| 2,532,800 | 12/50 | Adinamis et al. | 219—45 |
| 2,535,500 | 12/50 | Looft | 219—45 |
| 2,601,011 | 6/52 | Wilcox. | |
| 2,616,383 | 11/52 | Veltman et al. | 113—99 |
| 2,727,301 | 12/55 | Magnus | 29—498 |
| 2,859,368 | 11/58 | Biggs | 219—45 X |
| 2,987,597 | 6/61 | McCotter | 219—85 X |
| 3,046,651 | 7/62 | Olman et al. | 29—498 |
| 3,061,919 | 11/62 | Tack | 113—99 X |
| 3,128,544 | 4/64 | Allingham | 29—471.1 X |
| 3,136,032 | 6/64 | Berndsen. | |

FOREIGN PATENTS 152,821    10/20    Great Britain.

JOHN F. CAMPBELL, *Primary Examiner.*